United States Patent
Chu et al.

(10) Patent No.: US 7,233,375 B2
(45) Date of Patent: Jun. 19, 2007

(54) LIQUID CRYSTAL DISPLAY

(75) Inventors: Cheng-Jen Chu, Tainan County (TW);
Fu-Cheng Chen, Tainan County (TW);
Chien-Hung Chen, Tainan County (TW)

(73) Assignee: Chi Mei Optoelectronics Corp. (TW)

( * ) Notice: Subject to any disclaimer, the term of this patent is extended or adjusted under 35 U.S.C. 154(b) by 275 days.

(21) Appl. No.: 10/871,853

(22) Filed: Jun. 18, 2004

(65) Prior Publication Data
US 2006/0082704 A1    Apr. 20, 2006

(30) Foreign Application Priority Data
Nov. 6, 2003    (TW) .............................. 92131038 A

(51) Int. Cl.
*G02F 1/1335*    (2006.01)
*G02F 1/1333*    (2006.01)
(52) U.S. Cl. ...................... 349/114; 349/106
(58) Field of Classification Search ............... 349/114, 349/106, 113
See application file for complete search history.

(56) References Cited

U.S. PATENT DOCUMENTS

| | | | | |
|---|---|---|---|---|
| 6,624,860 B1* | 9/2003 | Narutaki et al. | ............ | 349/106 |
| 6,850,298 B2* | 2/2005 | Fujimori et al. | ............ | 349/114 |
| 2004/0109113 A1* | 6/2004 | Nakano et al. | ............ | 349/114 |
| 2005/0110923 A1* | 5/2005 | Yamashita et al. | .......... | 349/107 |
| 2006/0098143 A1* | 5/2006 | Nakamura et al. | .......... | 349/106 |

\* cited by examiner

*Primary Examiner*—Toan Ton
(74) *Attorney, Agent, or Firm*—Trop, Pruner & Hu, P.C.

(57) ABSTRACT

A liquid crystal display includes a first substrate and a second substrate, a liquid crystal layer disposed between the first and second substrate, and a backlight module disposed under the second substrate. The first substrate comprises color filters disposed in array, wherein each color filter has a chromaticity-adjusting region; a thickness of the color filters and a size of the chromaticity-adjusting region are adjustable for adjusting the chromaticity of the LCD. The second substrate comprises pixel electrodes corresponding to the color filters. Therefore, the liquid crystal display can easily adjust and perfect the chromaticity of the liquid crystal display under the restrictions of the material of the color filters, the backlight module, and the design thereof.

19 Claims, 5 Drawing Sheets

LIQUID CRYSTAL DISPLAY

BACKGROUND OF THE INVENTION

1. Field of the Invention

The present invention relates to a liquid crystal display (LCD), such as a transmissive LCD or a transflective LCD, and more particularly to a liquid crystal display adapted to adjust the chromaticity thereof.

2. Description of the Related Art

Recently, liquid crystal displays (LCD) have been widely used and combined with a variety of electronic devices. However, the manufacturing process of LCD is getting more and more complicated. Because LCD is not a self-luminous display, a light source is required for illuminating the LCD. The LCD are generally classified according to the light source, namely, transmissive LCD, transflective LCD and reflective LCD.

The reflective LCD has a reflective film formed on the bottom substrate for reflecting outside light. If the light source, such as front light, is not sufficient, reflective LCD cannot be used under the weak brightness environment.

The transmissive LCD with backlight modules can be used under the weak brightness environment. The transflective LCD cooperating with the backlight modules can also operate under the similar circumstances. Following are the descriptions of the two types of LCDs.

FIGS. 1A and 1B are exploded schematic drawings showing a prior art transflective LCD. FIGS. 2A and 2B are exploded schematic drawings showing a prior art transmissive LCD.

Referring to FIGS. 1A and 1B, the top portion 100a of the prior art transflective LCD includes a red, a green and a blue color filters 102a, 102b and 102c, respectively, are being disposed between the liquid crystal layer (not shown) and a glass substrate (not shown). The region 104 is the transmissive region of the transflective LCD. The bottom portion 100b of the transflective LCD includes pixel electrodes 106 disposed between the liquid crystal layer (not shown) and another glass substrate (not shown). The transmissive region 106b corresponds to the region 104 of FIG. 1A; the reflective region 106a is the area outside the transmissive region 106b. When the top and bottom portions 100a and 100b are combined, the backlight module (not shown) under the bottom portion 100b transmits white light passing through the transmissive region 106b, and the red, green and blue color filters 102a, 102b and 102c.

Additionally, referring to FIG. 2A, the top portion of the transmissive LCD has a structure similar to that of FIG. 1A. Referring to FIG. 2B, compared with FIG. 1B the pixel electrode 206 is a transparent electrode 206. When the structures of FIGS. 2A and 2B are combined, the backlight module (not shown) under the bottom portion 100b transmits white light passing through the transmissive region 206, and the red, green and blue color filters 202a, 202b and 202c.

However, because of the restrictions under the circumstances, such as the material of the color filters, the backlight module and the design of the LCD, the prior art LCD cannot easily adjust the chromaticity thereof The problem will be more serious when the transmissive LCD and the transflective LCD need to generate sufficient chromaticity of the red, green and blue lights, as well as white light.

SUMMARY OF THE INVENTION

Therefore, an object of the present invention is to provide a liquid crystal display (LCD) for adjusting the chromaticity of the transmissive regions.

Another object of the present invention is to provide a liquid crystal display (LCD) for adjusting the chromaticity of the transmissive regions under the restrictions of the material of the color filters, the backlight module and the design thereof.

According to the objects described above, the present invention discloses a LCD, which comprises a first substrate, a second substrate, a liquid crystal layer disposed between the first and the second substrates, and a backlight module under the second substrate. The first substrate has a plurality of color filters arranged in array, wherein each of the color filters has a chromaticity-adjusting region, and each thickness of the color filters and the size of the chromaticity-adjusting region are adjustable for adjusting a chromaticity of the LCD. The second substrate has a plurality of pixel electrodes corresponding to the color filters.

In the embodiment of the present invention, the chromaticity-adjusting region includes an opening.

The present invention also provides a transmissive LCD, which comprises a first substrate, a second substrate, a liquid crystal layer disposed between the first and the second substrates, and a backlight module under the second substrate. The first substrate has a plurality of color filters arranged in array, wherein each of the color filters has a chromaticity-adjusting region, and the thickness of each of the color filters and the size of the chromaticity-adjusting region are adjustable for adjusting the chromaticity of the LCD. The second substrate has a plurality of transparent electrodes corresponding to the color filters.

The present invention further provides a transflective LCD, which comprises a first substrate, a second substrate, a liquid crystal layer disposed between the first and the second substrates, and a backlight module under the second substrate. The second substrate has a plurality of pixel electrodes arranged in array, wherein each of the pixel electrodes has a transmissive region and a reflective region. The first substrate having a plurality of color filters arranged in array, wherein each of the color filters has a chromaticity-adjusting region, and the thickness of each of the color filters and the size of the chromaticity-adjusting region are adjustable for adjusting the chromaticity of the LCD.

Because the present invention disposes a chromaticity-adjusting region in each color filter, the size of the chromaticity-adjusting region and the thickness of the color filters are adjustable. Therefore, the chromaticity can be adjusted by adjusting the chromaticity-adjusting region. Moreover, because the present invention allows the adjustment of the chromaticity of the transmissive regions under the restrictions of the material of the color filters, the backlight module and the design thereof the performance of the LCD can be perfect.

In order to make the aforementioned and other objects, features and advantages of the present invention understandable, a preferred embodiment accompanied with figures is described in detail below.

DESCRIPTION OF SOME EMBODIMENTS

Figure 3:
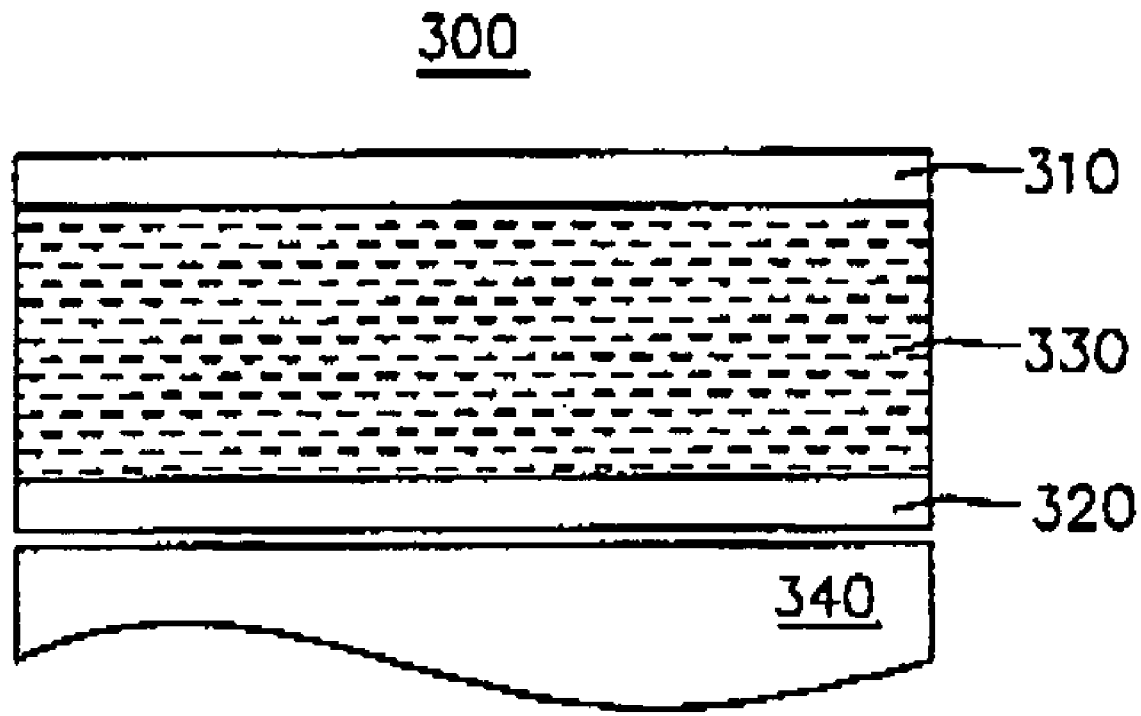
FIG. 3 is a schematic drawing of a liquid crystal display (LCD).

FIG. 3 is a schematic drawing of a liquid crystal display (LCD). Referring to FIG. 3, the LCD 300 comprises: a first substrate 310, a second substrate 320, a liquid crystal layer 330 disposed between the first and the second substrates 310 and 320, respectively, and a backlight module 340 under the second substrate 320. The LCD 300 can be, for example, a transmissive LCD or a transflective LCD (TRLCD). In the present invention, the LCD 300 has a chromaticity-adjusting region in each color filter for adjusting the chromaticity of the LCD as desired. Following are embodiments of the present invention, but not limited thereto.

Figure 4A:
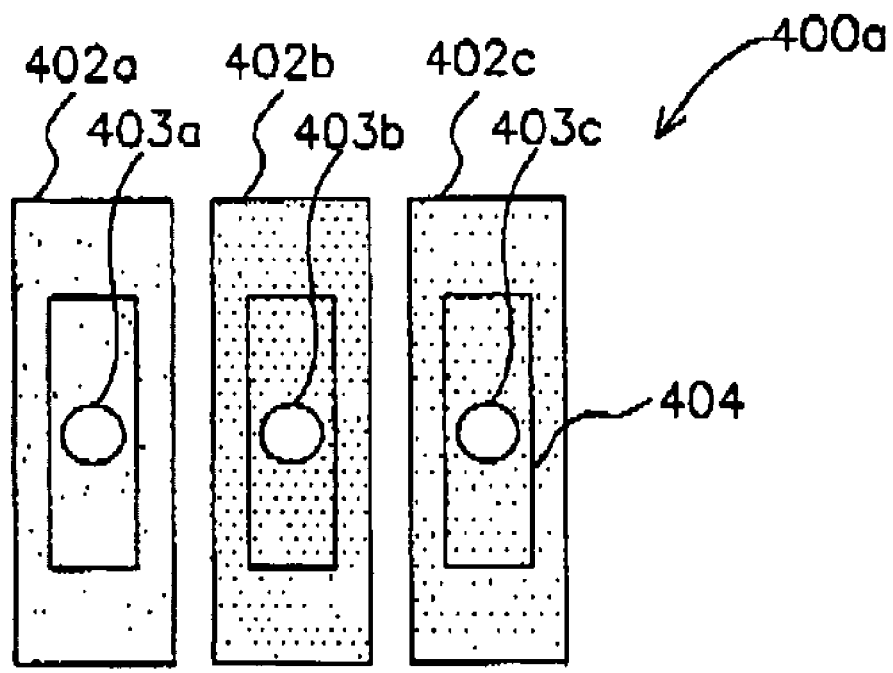
FIGS. 4A and 4B are exploded schematic drawings showing a first exemplary pixel structure of a transflective LCD of the present invention.
Figure 4B:
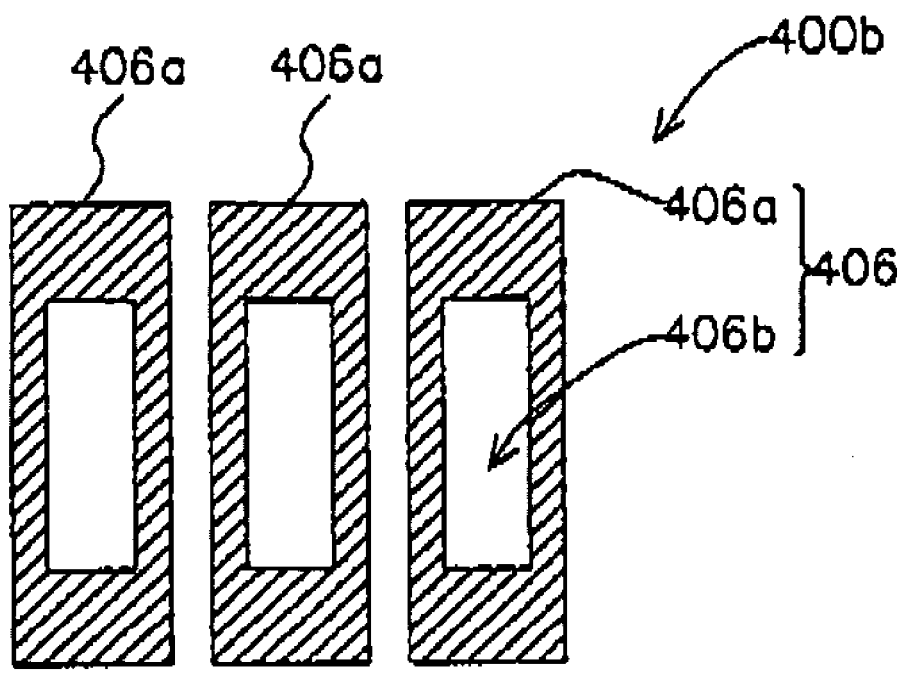

FIGS. 4A and 4B are exploded schematic drawings showing a first exemplary pixel structure of a transflective LCD of the present invention. Referring to FIGS. 3, 4A and 4B, the top half portion 400a of the transflective LCD includes color filters, including red, green, and blue color filters 402a, 402b and 402c, respectively, on the fist substrate 310. The red, green, and blue color filters 402a, 402b and 402c have chromaticity-adjusting regions 403a, 403b and 403c, respectively, which size can be adjusted separately or together for adjusting the chromacity of the LCD as desired. The chromaticity-adjusting regions 403a, 403b and 403c can be, for example, in a form openings. In addition, according to the embodiment of the present invention, the thickness of the color filters 402a, 402b and 402c are also being adjusted for perfecting the chromaticity. The region 404 shown in FIG. 4A is the transmissive region of the transflective LCD.

Referring to FIGS. 3, 4A and 4B, the bottom half portion 400b of the transflective LCD includes the pixel electrodes 406 on the second substrate 320, corresponding to the red, green, and blue color filters 402a, 402b and 402c. The pixel electrode 406 has a transmissive region 406b and a reflective region 406a, wherein the chromaticity-adjusting regions 403a, 403b and 403c correspond to the transmissive region 406b of each pixel electrode 406. The transmissive region 406b of the pixel electrode 406 corresponds to the region 404 shown in FIG. 4A. When the top and bottom portions 400a and 400b, respectively, of the pixel are combined, a pixel structure is formed as shown in FIG. 3. The transmissive region 406b of the pixel electrode 406 can be, for example, indium tin oxide (ITO); the reflective region 406a of the pixel electrode 406 can be, for example, a metal electrode.

Figure 5A:
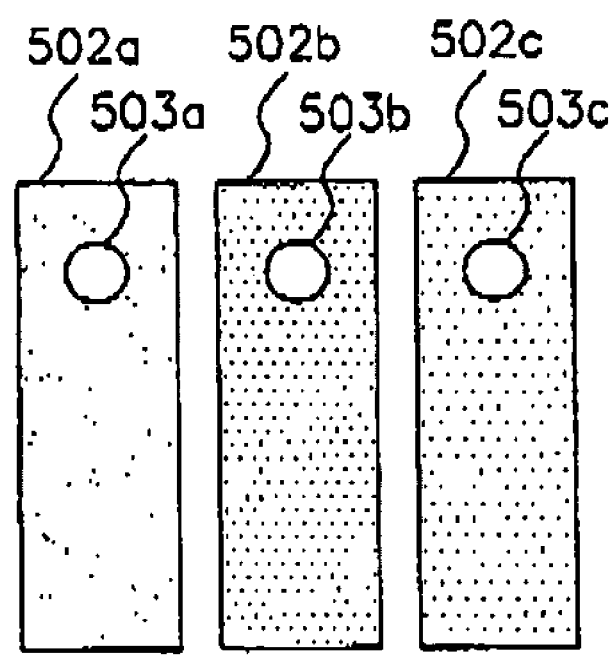
FIGS. 5A and 5B are exploded schematic drawings showing a second exemplary pixel structure of a transmissive LCD of the present invention.
Figure 5B:
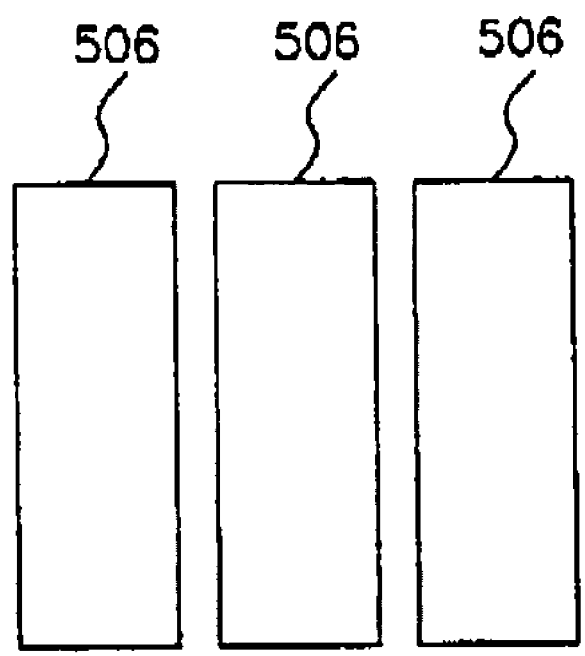

FIGS. 5A and 5B are exploded schematic drawings showing a second exemplary pixel structure of a transmissive LCD of the present invention. Referring to FIGS. 3, 5A and 5B, the top half portion 400a of the transmissive LCD include the color filters, including red, green, and blue color filters 502a, 502b and 502c, respectively, on the first substrate 310. The red, green, and blue color filters 502a, 502b and 502c have chromaticity-adjusting regions 503a, 503b and 503c, respectively, which size can be adjusted separately or together for adjusting the chromaticity as desired.

Figure 1A:
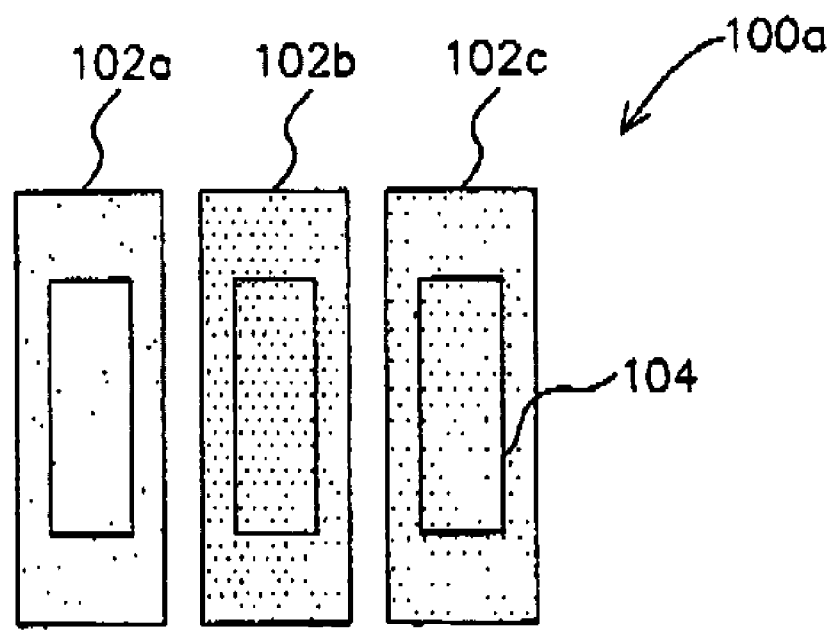
FIGS. 1A and 1B are exploded schematic drawings showing a prior art transflective LCD.
Figure 1B:
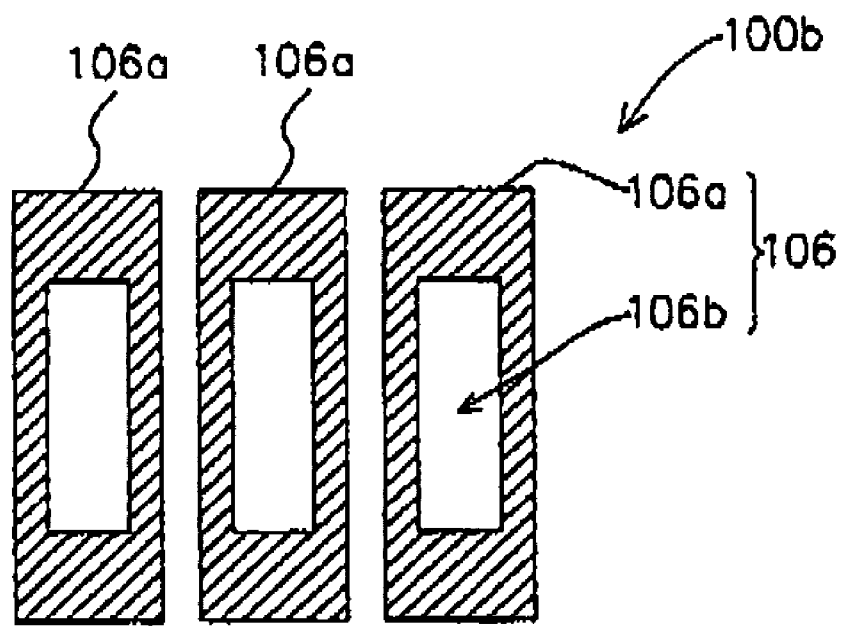
Figure 2A:
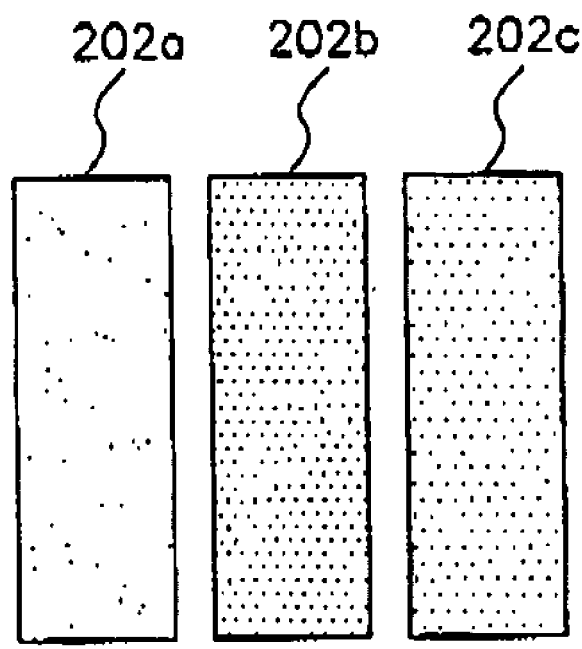
FIGS. 2A and 2B are exploded schematic drawings showing a prior art transmissive LCD.
Figure 2B:
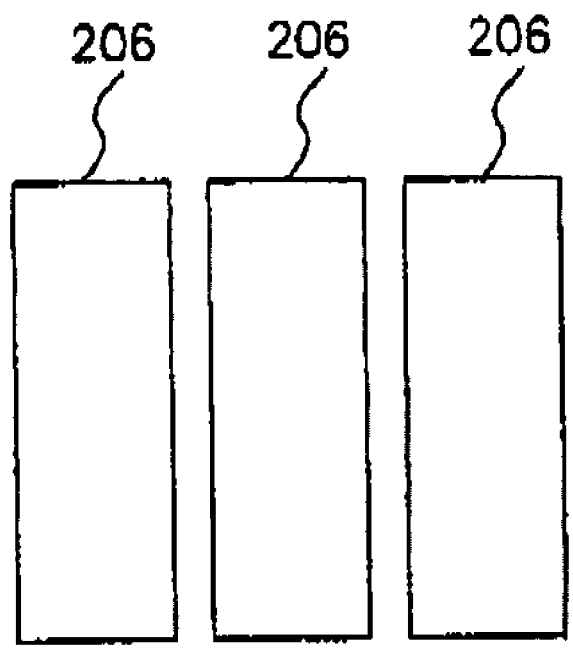

Referring to FIGS. 3, 5A and 5B, compared with FIG. 1B the bottom half portion of the transmissive LCD is a transparent electrode, such as ITO. When the structures of FIGS. 5A and 5B are combined, a pixel structure is formed as shown in FIG. 3. The backlight module 340 under the second substrate 320 transmits white light passing through the transparent electrode 506, the liquid crystal layer 320 and the red, green, and blue color filters 502a, 502b and 502c, respectively.

Accordingly, the feature of the present invention is to dispose a chromaticity-adjusting region in each color filter, wherein the size of the chromaticity-adjusting region and the thickness of the color filters are adjustable. Therefore, a desired chromaticity can be achieved by the adjusting of the chromaticity-adjusting region. Moreover, because the present invention allows the adjustment of the chromaticity of the transmissive regions under the restrictions of the material of the color filters, the backlight module and the design thereof, the performance of the LCD can be according promoted.

Although the present invention has been described in terms of exemplary embodiments, it is not limited thereto. Rather, the appended claims should be constructed broadly to include other variants and embodiments of the invention which may be made by those skilled in the field of his art without departing from the scope and range of equivalents of the invention.

What is claimed is:

1. A liquid crystal display (LCD), comprising:
   a first substrate, having a plurality of color filters arranged in an array, wherein each of the color filters has a chromaticity-adjusting region, and a thickness of each of the color filters and size of the chromaticity-adjusting region for each color filter are adjustable for adjusting a chromaticity of the LCD;
   a second substrate, corresponding to the first substrate, having a plurality of pixel electrodes corresponding to the color filters, wherein each of the pixel electrodes has a transmissive region, and wherein the chromaticity-adjusting regions of the color filters correspond to respective transmissive regions of the pixel electrodes;
   a liquid crystal layer, disposed between the first and the second substrates; and
   a backlight module to transmit light through the transmissive regions and the liquid crystal layer.

2. The LCD of claim 1, wherein the chromaticity-adjusting region includes an opening.

3. The LCD of claim 1, wherein the color filters include red, green and blue color filters.

4. The LCD of claim 1, wherein the pixel electrodes include transparent electrodes.

5. The LCD of claim 4, wherein a material of each pixel electrode includes indium tin oxide.

6. The LCD of claim 1, wherein each of the pixel electrodes further has a reflective region.

7. The LCD of claim 6, wherein the transmissive region of each of the pixel electrodes includes a transparent electrode.

8. The LCD of claim 6, wherein the reflective region of each of the pixel electrodes comprises a metal electrode.

9. A transflective liquid crystal display (LCD), comprising:
   a first substrate, having a plurality of pixel electrodes arranged in an array, wherein each of the pixel electrodes has a transmissive region and a reflective region;
   a second substrate, corresponding to the first substrate, having a plurality of color filters corresponding to the pixel electrodes, wherein each of the color filters has a chromaticity-adjusting region corresponding to the each transmissive region of the pixel electrodes, and a thickness of each of the color filters and a size of the chromaticity-adjusting region are adjustable for adjusting a chromaticity of the LCD;

a liquid crystal layer, disposed between the first and the second substrates; and a backlight module, disposed under the second substrate.

10. The transflective LCD of claim 9, wherein each chromaticity-adjusting region includes an opening.

11. The transflective LCD of claim 9, wherein the color filters include red, green and blue color filters.

12. The transflective LCD of claim 9, wherein each of the transmissive regions of the pixel electrodes includes a transparent electrode.

13. The transflective LCD of claim 9, wherein each of the reflective regions of the pixel electrodes comprises a metal electrode.

14. The LCD of claim 1, comprising a transmissive LCD.

15. A method for providing a liquid crystal display (LCD), comprising:

providing a first substrate having an array of color filters;

providing chromaticity-adjusting regions in respective color filters;

adjusting sizes of the chromaticity-adjusting regions to adjust a chromaticity of the LCD;

adjusting thickness of the color filters to adjust the chromaticity of the LCD;

providing a second substrate having a plurality of pixel electrodes corresponding to the color filters, wherein each of the pixel electrodes has a transmissive region, wherein providing the chromaticity-adjusting regions in respective color filters comprises providing chromaticity-adjusting regions corresponding to transmissive regions of the pixel electrodes; and providing a liquid crystal layer between the first and second substrates.

16. The method of claim 15, wherein providing the chromaticity-adjusting regions comprises providing chromaticity-adjusting regions having respective openings.

17. The method of claim 15, further comprising providing a reflective region in each of the pixel electrodes.

18. The method of claim 15, wherein providing the LCD comprises providing a transmissive LCD.

19. The method of claim 15, wherein providing the LCD comprises providing a transflective LCD.

* * * * *